(12) United States Patent
Jones et al.

(10) Patent No.: US 6,894,418 B2
(45) Date of Patent: May 17, 2005

(54) NESTED STATOR COILS FOR PERMANENT MAGNET MACHINES

(75) Inventors: Franklin B. Jones, Shrewsbury, MA (US); Stuart A. Jones, Wrentham, MA (US)

(73) Assignee: Comprehensive Power, Inc., Marlborough, MA (US)

( * ) Notice: Subject to any disclaimer, the term of this patent is extended or adjusted under 35 U.S.C. 154(b) by 0 days.

(21) Appl. No.: 10/615,895

(22) Filed: Jul. 9, 2003

(65) Prior Publication Data
US 2004/0021391 A1 Feb. 5, 2004

Related U.S. Application Data
(60) Provisional application No. 60/399,551, filed on Jul. 30, 2002.

(51) Int. Cl.⁷ .................................................. H02K 3/04
(52) U.S. Cl. ........................ 310/208; 310/266; 310/268; 310/211; 310/179; 310/184; 310/180
(58) Field of Search ................................. 310/208, 266, 310/268, 179, 184

(56) References Cited

U.S. PATENT DOCUMENTS

| | | | | |
|---|---|---|---|---|
| 2,108,523 A | * | 2/1938 | Bowman-Manifold | 310/194 |
| 4,197,475 A | * | 4/1980 | Ban et al. | 310/266 |
| 4,551,645 A | * | 11/1985 | Takahashi et al. | 310/198 |
| 4,665,331 A | * | 5/1987 | Sudo et al. | 310/184 |
| 4,677,332 A | * | 6/1987 | Heyraud | 310/268 |
| 4,710,667 A | * | 12/1987 | Whiteley | 310/268 |
| 5,493,157 A | * | 2/1996 | Nakamura | 310/208 |
| 5,625,276 A | * | 4/1997 | Scott et al. | 310/179 |
| 5,723,933 A | * | 3/1998 | Grundl et al. | 310/266 |
| 5,744,896 A | * | 4/1998 | Kessinger et al. | 310/208 |
| 6,034,463 A | | 3/2000 | Hansson | |
| 6,140,734 A | | 10/2000 | Hazelton et al. | |
| 6,570,273 B2 | * | 5/2003 | Hazelton | 310/12 |

FOREIGN PATENT DOCUMENTS

JP 04058747 A * 2/1992 .......... H02K/15/04

* cited by examiner

Primary Examiner—Darren Schuberg
Assistant Examiner—Yahveh Comas
(74) Attorney, Agent, or Firm—Guerin & Rodriguez, LLP; William G. Guerin

(57) ABSTRACT

An arrangement of coils of different configurations for use in the stator of a slotless radial gap electromotive machine is described. The coils include coils of a first configuration and a second configuration. Each coil includes longitudinal sections and circumferential sections that form a substantially rectangular opening in the coil. The coils are nested together along the inside of a stator core so that the longitudinal sections of each coil of the first configuration are disposed in the rectangular openings of neighboring coils of the second configuration, and the longitudinal sections of the coils of the second configuration are disposed in the rectangular openings of neighboring coils of the first configuration. Other configurations of coils can be nested together inside the stator core to provide one or more additional layers of stator coils.

5 Claims, 8 Drawing Sheets

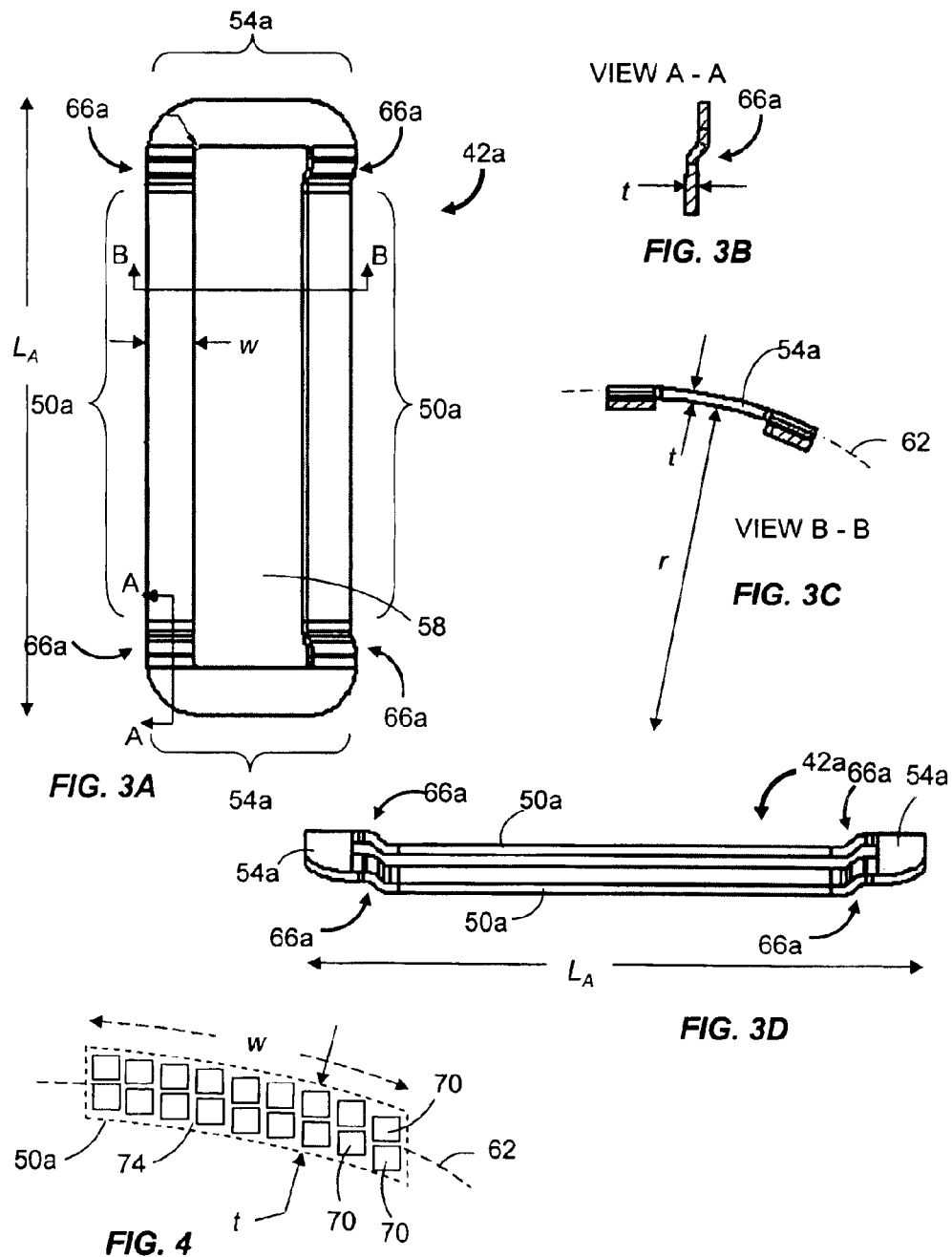

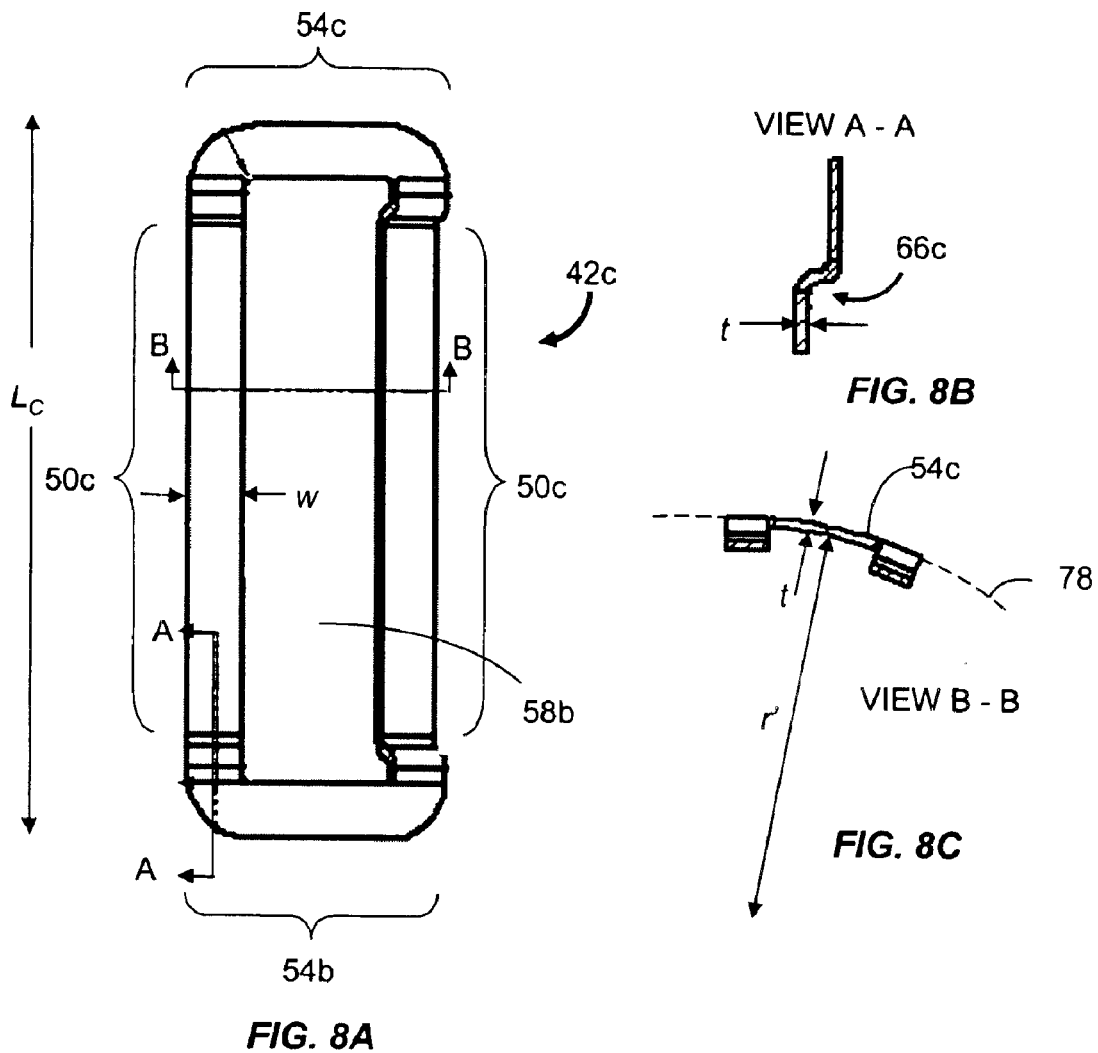
*FIG. 8A*
*FIG. 8B*
*FIG. 8C*
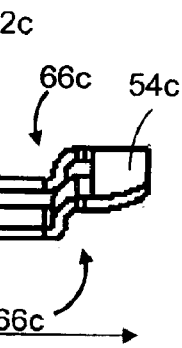
*FIG. 8D*

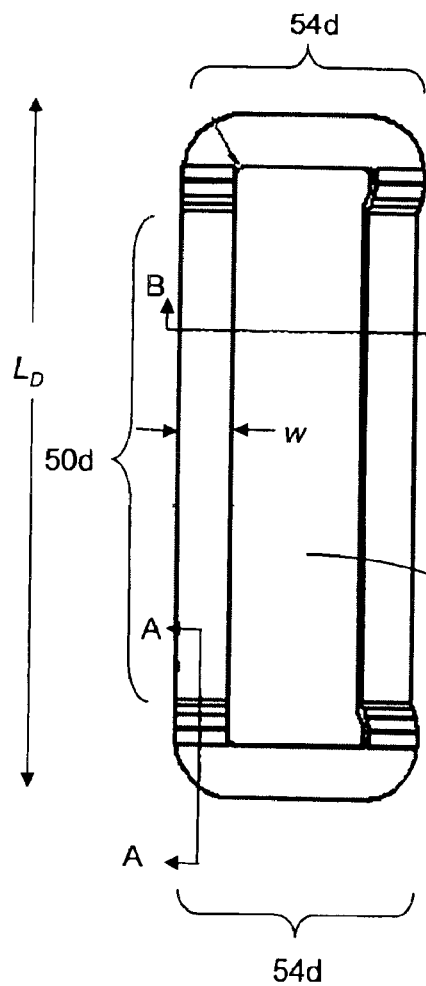
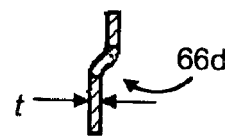
FIG. 9B
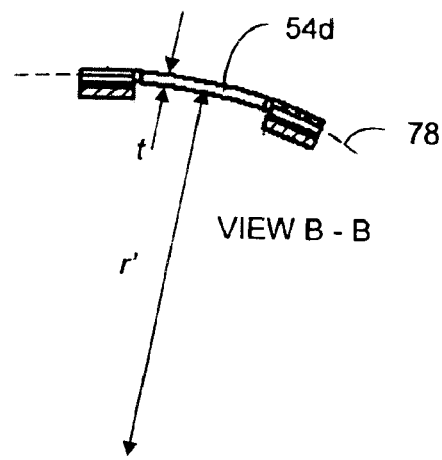
FIG. 9C
FIG. 9A
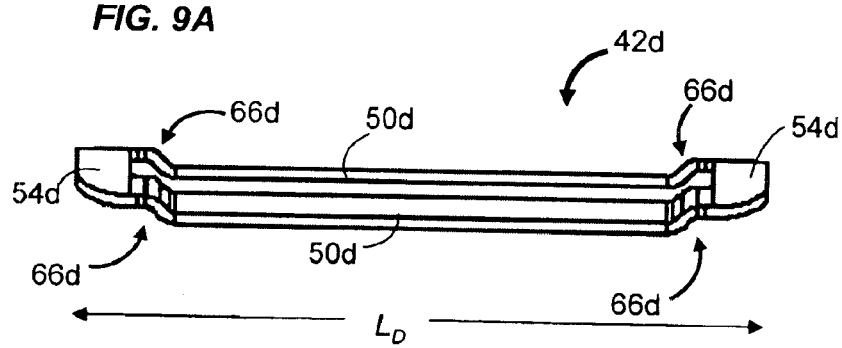
FIG. 9D

NESTED STATOR COILS FOR PERMANENT MAGNET MACHINES

CROSS-REFERENCE TO RELATED APPLICATIONS

This application claims the benefit of the filing date of co-pending U.S. provisional patent application Ser. No. 60/399,551, filed Jul. 30, 2002, titled "Nested Stator Windings for Slotless Permanent Magnet Machines," the entirety of which provisional application is incorporated by reference herein.

FIELD OF THE INVENTION

The invention relates generally to windings for motors and generators. More particularly, the invention relates to nested stator windings for permanent magnet machines.

BACKGROUND

Stator windings in electric machines are typically wound in the stator by looping wire through the slots of a stator assembly. Although low in cost, this method of making motors and generators is limited to moderate power machines. For higher power machines, preformed coils that fit into the slots of the stator assembly are preferred. Each coil has a substantially rectangular shape that closely matches the shape of a slot. The geometry of the motor favors the use of identical coils for all of the phases.

Recently, progress has been made in the design of slotless DC machines. Slotless machines are sometimes used in high speed motors for which the magnetic losses associated with the teeth in slotted machines are prohibitive. Low cost motors often utilize slotless configurations because of the high cost of inserting windings between teeth. Slotless machines are also used in precision applications to avoid other problems that occur with teeth. For example, cogging torque caused by the teeth is responsible for non-uniform angular velocity and torque ripple, and is particularly problematic in low power motors.

Advances in superconductors and permanent magnet materials now make it feasible to develop high power slotless machines. For example, coil configurations have been developed for axial gap, radial gap and linear slotless machines. Similar to existing slotted coil designs, these slotless coil configurations typically include coil thicknesses that match or exceed the coil width. Unfortunately, coil configurations for slotless machines generally do not satisfy the size, cost and performance requirements necessary to produce a commercially practical slotless machine utilizing radial magnetic fields. The coils have complex bends that increase fabrication costs. Moreover, the thickness of the coils decreases the magnetic efficiency of the machine. In addition, the radial build, or increase in the effective radius of the stator core, due to the end turns of the coils increases the overall motor size.

Accordingly, there exists a need for a coil configuration that is wide and thin, and includes short end turns with minimal radial build. The coils should be easily fabricated using standard materials for low cost. The present invention satisfies these needs and provides additional advantages.

SUMMARY OF THE INVENTION

In one aspect the invention features a stator coil group for an electromotive machine. The stator coil group includes a first coil having longitudinal sections, circumferential sections and a thickness. Each of the longitudinal sections has a width forming a first curve. The longitudinal sections and the circumferential sections define a substantially rectangular opening. The stator coil group also includes a second coil having longitudinal sections, circumferential sections and a thickness. Each of the longitudinal sections of the second coil has a width forming the first curve. The longitudinal sections and the circumferential sections of the second coil define a substantially rectangular opening. The widths of the longitudinal sections of the first and second coils is greater than the respective thicknesses of the first and second coils. One of the longitudinal sections of the first coil is at least partially disposed in the rectangular opening of the second coil and one of the longitudinal sections of the second coil is at least partially disposed in the rectangular opening of the first coil.

In one embodiment the longitudinal sections of the first and second coils have ends. At least one of the first coil and the second coil have step bends at each end of the respective longitudinal sections. In another embodiment the stator includes a plurality of first coils and a plurality of second coils. Each of the first coils is in serial electrical communication with a respective one of the second coils to form a coil pair. In a further embodiment one of the coil pairs is in parallel electrical communication with one of the other coil pairs. In yet another embodiment the stator coil group also includes a first outer coil and a second outer coil. The first outer coil and second outer coil each have longitudinal sections, circumferential sections and a thickness. Each of the longitudinal sections of the first outer coil and the second outer coil have a width forming a second curve. The longitudinal sections and circumferential sections of the first outer coil define a substantially rectangular opening and the longitudinal sections and circumferential sections of the second outer coil define a substantially rectangular opening. The widths of the longitudinal sections of the first and second outer coils is greater than the respective thicknesses of the first and second outer coils. One of the longitudinal sections of the first outer coil is at least partially disposed in the rectangular opening of the second outer coil and one of the longitudinal sections of the second outer coil is at least partially disposed in the rectangular opening of the first outer coil. In a further embodiment each of the second outer coils is in serial electrical communication with one of the first coils, one of the second coils and one of the first outer coils to form a coil set. The coil set can be in parallel electrical communication with another coil set.

In another aspect, the invention features an electromotive machine including a permanent magnet rotor having a rotor axis, a plurality of first coils and a plurality of second coils. Each of the first coils has a pair of longitudinal sections, a pair of circumferential sections and a thickness. Each of the longitudinal sections has a width forming a first curve. The longitudinal sections and circumferential sections of each first coil define a substantially rectangular opening. Each of the second coils has a pair of longitudinal sections, a pair of circumferential sections and a thickness. Each of the longitudinal sections of the second coils has a width forming the first curve. The longitudinal sections and circumferential sections of each second coil define a substantially rectangular opening. The widths of the longitudinal sections of the first and second coils is greater than the respective thicknesses of the first and second coils. The longitudinal sections of the first and second coils are disposed at a fixed radial distance from the rotor axis. One of the longitudinal sections of each first coil is at least partially disposed in the rectangular opening of an adjacent one of the second coils and one of the longitudinal sections of each second coil is at least partially disposed in the rectangular opening of an adjacent one of the first coils.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIGS. 3A, 3B, 3C and 3D are illustrations of one type of coil used in the stator of FIG. 2.

FIG. 4 is a cross-sectional illustration of a longitudinal section of the coil of FIG. 3.

FIGS. 8A, 8B, 8C and 8D are illustrations of one type of coil used in the stator of FIG. 6.

FIGS. 9A, 9B, 9C and 9D are illustrations of another type of coil used in the stator of FIG. 6.

DETAILED DESCRIPTION

In brief overview, the present invention relates to stator coils for an electromotive machine that nest together to form a stator having a high conductor density and compact end turns. The coils are thin and wide to allow improvement of the magnetic design. The compact end turns do not radially extend beyond the stator core, therefore, there is no increase in the volume of the electromotive machine.

Figure 1:
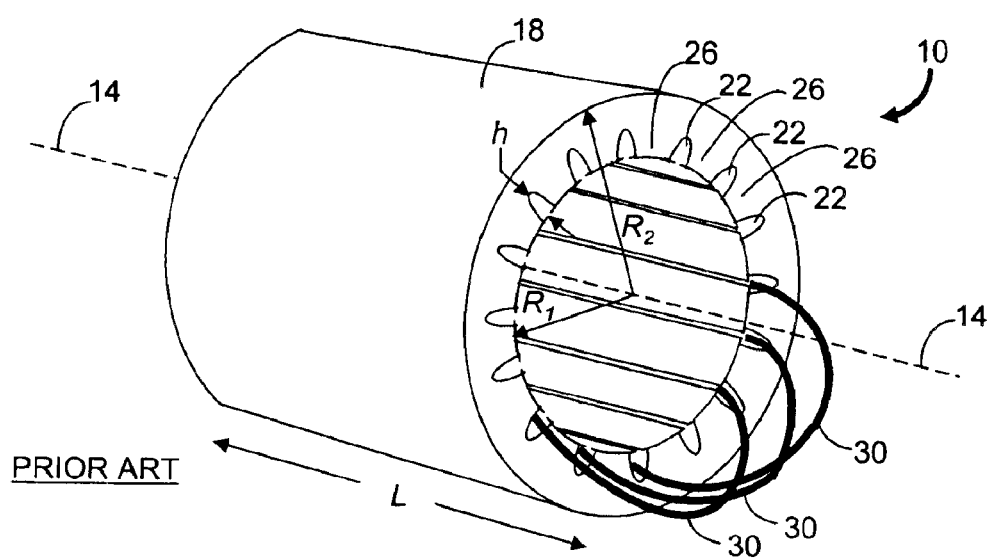
FIG. 1 is an illustration of a conventional stator coil for an electric machine having radial magnetic fields.

FIG. 1 illustrates a conventional stator 10 for a slotted electromotive machine. The stator 10 is substantially tubular in shape and is centered about an axis 14. The stator 10 includes a stator core 18 having a plurality of slots 22 that extend along the length L of the core 18. Each slot 22 is separated from its two adjacent slots 22 by teeth 26 that are equally spaced around the stator core 18. An arrangement of coils 30 (only three shown for clarity) occupies the slots 22. Each coil 30 includes multiple loops of insulated magnet wire which are constrained to the slots by protrusions in the teeth 26 that extend over the slots 22. Generally, the slots 22 occupied by a single coil 30 are not adjacent, thus a coil 30 is typically partially overlapped by one or more other coils 30 in neighboring slots 22.

To fabricate the stator 10 flexible wire (e.g., Litz wire, magnet wire) is wound through a respective pair of slots 22 in an alternating fashion until the thickness of the coil 30 (i.e., the radial extent of the collection of magnet wire in the slots 22) is increased to almost the height h of the slots 22. Each coil 30 has a length that is substantially greater than the length L of the stator core 18. At each end of the stator core 18 each coil 30 extends out from one of its slots 22 and loops around to "return" to its other slot 22. These coil "end portions" are arranged outside the inner radius $R_1$ of the stator core 18 to avoid interference with the rotor (not shown). However, the end portions often extend beyond the outer radius $R_2$ of the stator core 18. Thus the end portions contribute substantially to the overall size of the stator 10.

During motor operation, each coil 30 is excited with an alternating electrical current of proper electrical phase to generate a magnetic field that interacts with an adjacent magnet pole on the rotor, resulting in a rotation of the rotor about axis 14. The end portions of the coils 30 do not effectively contribute to the magnetic field within the stator core 18, but are required to conduct the electrical current from one side of the coil 30 to the other side.

The slotted stator 10 has many disadvantages. In some machine applications the magnetic losses associated with the teeth 26 are prohibitive. In other applications the torque is adversely affected by the present of the teeth 26. Moreover, the manufacturing costs can be unacceptable due to the process of winding the conductor in the slots between the teeth 26. In addition, the volume of the machine is increased substantially by the end portions of the coils 30. Because the flexible wire is generally multi-strand wire, a significant portion of each coil 30 includes air and insulation. Consequently, the thermal conductivity of the coils is less than that for solid conductors, thus limiting the maximum current through the coils.

Figure 2:
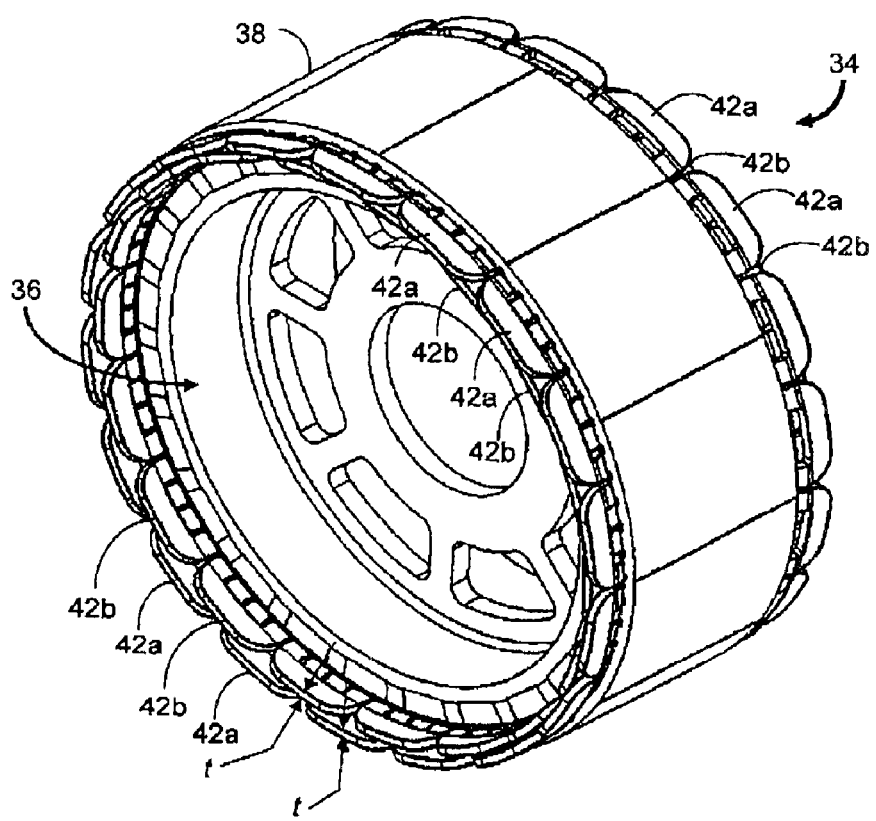
FIG. 2 is an illustration of an embodiment of a stator in accordance with the principles of the invention.
Figure 5A:
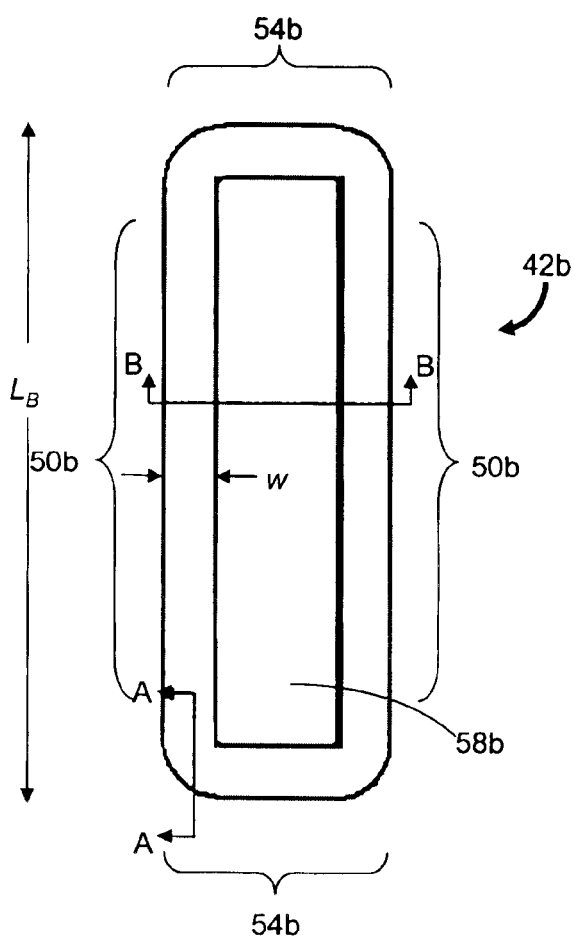
FIGS. 5A, 5B, 5C and 5D are illustrations of another type of coil used in the stator of FIG. 2.
Figure 5B:
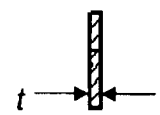
Figure 5C:
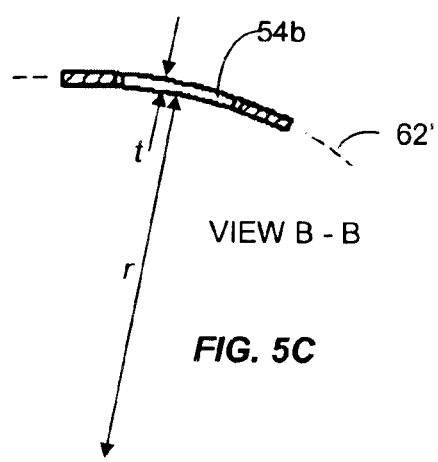
Figure 5D:
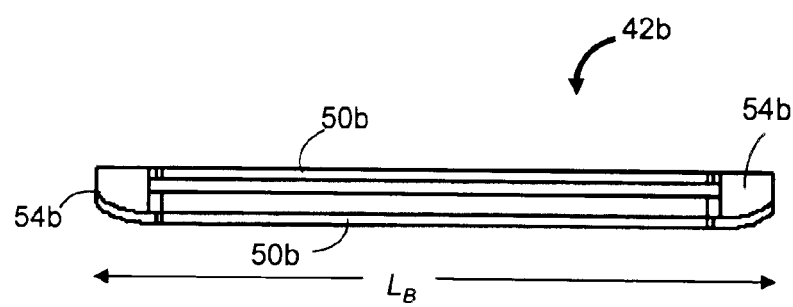

FIG. 2 illustrates a stator 34 constructed in accordance with the principles of the invention. The stator 34 includes a slotless stator core 38 populated with two types of coils 42a and 42b (generally 42) and partially enclosing a permanent magnet rotor 36. The coils 42 are fabricated from commercially-available square magnet wire having an insulating coating (e.g., polyamide layer). Some coils 42a are formed in a first ("A") configuration and the other coils 42b are formed in a second ("B") configuration as described below. The specific dimensions for each configuration are determined according to the specific machine design parameters but are also limited by the minimum bend radius of the magnet wire to avoid fracture of the wire and the wire insulation.

After coil shaping is completed and the coils 42 are fitted together, or nested, around the inside of the stator core 38, vacuum pressure impregnation is used to impregnate the coils 42 with an epoxy resin. The epoxy resin fills the air voids in the coils 42 and provides additional insulation for the individual coil wire loops. The resulting coils 42 exhibit improved thermal conductivity compared to conventional stator coils having similar cross-sectional areas. In addition, the coil populated stator core 38 has a high conductor density. Advantageously, the coils 42 do not radially extend inside the stator core 38. Moreover, the thickness t of the coils 42 is less than the thickness of conventional stator coils, and therefore the coils 42 do not substantially contribute to the volume of the machine.

FIGS. 3A to 3D show a variety of views for an A coil 42a used to fabricate the stator of FIG. 2. The A coil 42a includes two longitudinal sections 50a and two circumferential sections 54a which together describe an approximately rectangular opening 58a. Two wire leads (not shown) extend from one of the circumferential sections 54a to allow external connection to other similarly phased coils 42 and electrical control equipment. The longitudinal sections 50a have a width w that lies along a curve 62 having a radius r approximately equal to the distance to the stator axis. A step bend 66a is located near each end of each longitudinal section 50a. An end as used herein is defined as the region where a longitudinal section 50a meets a circumferential section 54a. Each step bend 66a includes a pair of closely spaced turns in the coil 42a to create an increased radial distance from the circumferential sections 54a to the stator axis as compared to the radial distance from the longitudinal sections 50a to the stator axis. The locations and angle of the bends 66a are chosen for manufacturing ease and to minimize the coil length $L_A$. The increased radial distance to the stator axis exceeds the thickness t of the coils 42 and allows the circumferential sections 54a of the A coil 42a to avoid interfering with the circumferential sections of the B coils 42b as described in more detail below.

FIG. 4 is a cross-sectional illustration of a longitudinal section 50a of the A coil 42a of FIG. 3. The coil 42a is formed, as described below, to generate the desired curve 62 along the width w of the longitudinal section 50. The coil 42a includes two layers of insulated square magnet wire 70 with each layer having nine wire loops. Improved thermal conductivity is realized because each wire 70 has a solid cross-section, the wires 70 are tightly packed and an epoxy resin 74 occupies space between the wires 70 instead of air. It should be recognized that coils having other cross-sectional arrangements of wire 70 are contemplated by the present invention. The cross-sectional arrangement of wires 70 in the figure is similar to the cross-sectional wire arrangement of other coil configurations described below.

The A coil 42a can be fabricated according to standard coil forming methods known in the art. Alternatively, the A coil 42a can be formed by first spooling half of the required length of wire 70 onto a secondary bobbin. Next, a planar rectangular coil is formed by winding the wire 70 around a mandril from the inside out. The two layers of wire 70 are wound at the same time in opposite directions, one layer from a primary bobbin and the other layer from the secondary bobbin. When the planar coil is complete, all of the wire 70 from the secondary bobbin is used and both ends of the wire 70 are available at the outside of the planar coil for easy connection to electrical control equipment and other coils. The planar coil is placed in a form contoured according to the dimensions of the desired configuration. The planar coil is pressed into the form to achieve the final shape. This technique can also be applied to generate other coil configurations described below.

FIGS. 5A to 5D show a variety of views for a B coil 42b used to fabricate the stator 34 of FIG. 2. Similar to the A coil 42a described above, the B coil 42b includes two longitudinal sections 50b and two circumferential sections 54b which together describe an approximately rectangular opening 58b. Two wire leads (not shown) extend from one of the circumferential sections 54b to allow external connection to other similarly phased coils 42 and electrical control equipment. The longitudinal sections 50b have a width w that lies along a curve 62' having the same radius r as the curve 62 for the A coil as depicted in FIG. 3C. Unlike the A coil 42a, however, the B coil 42b has no step bends.

Referring now to FIGS. 2, 3 and 5, the stator core 38 is populated with coils by inserting A coils 42a in a side by side arrangement along the inner surface of the stator core 38 using insulated spacers to separate the individual coils 42a. The B coils 42b are inserted such that each longitudinal section 50b lies within the rectangular opening 58a of a respective neighboring A coil 42a. Similarly, the rectangular opening 58b in the B coil is occupied by a longitudinal section 50a of each of the neighboring A coils 42a. The step bends 66a of the A coils 42a prevent the circumferential sections 54a of the A coils 42a from interfering with the circumferential sections 54b of the B coils 42b. Moreover, because the radial distance from the circumferential sections 54a of the A coils 42a to the stator axis is increased by the presence of the step bends 66a, there is no reduction in the effective radius of the stator core 38.

The inductances and resistances of the coils 42 differ according to each configuration. Each A coil 42a is serially connected to a B coil 42b to form a coil pair. Thus each coil pair has substantially the same inductance and resistance as the other coil pairs. Optionally, the coil pair is serially connected with one or more other coil pairs. In another alternative, a coil pair is connected in parallel with one or more other coil pairs. Other combinations of serial and parallel electrical connections are possible to accommodate the desired electromotive force at a base speed of the machine.

Figure 6:
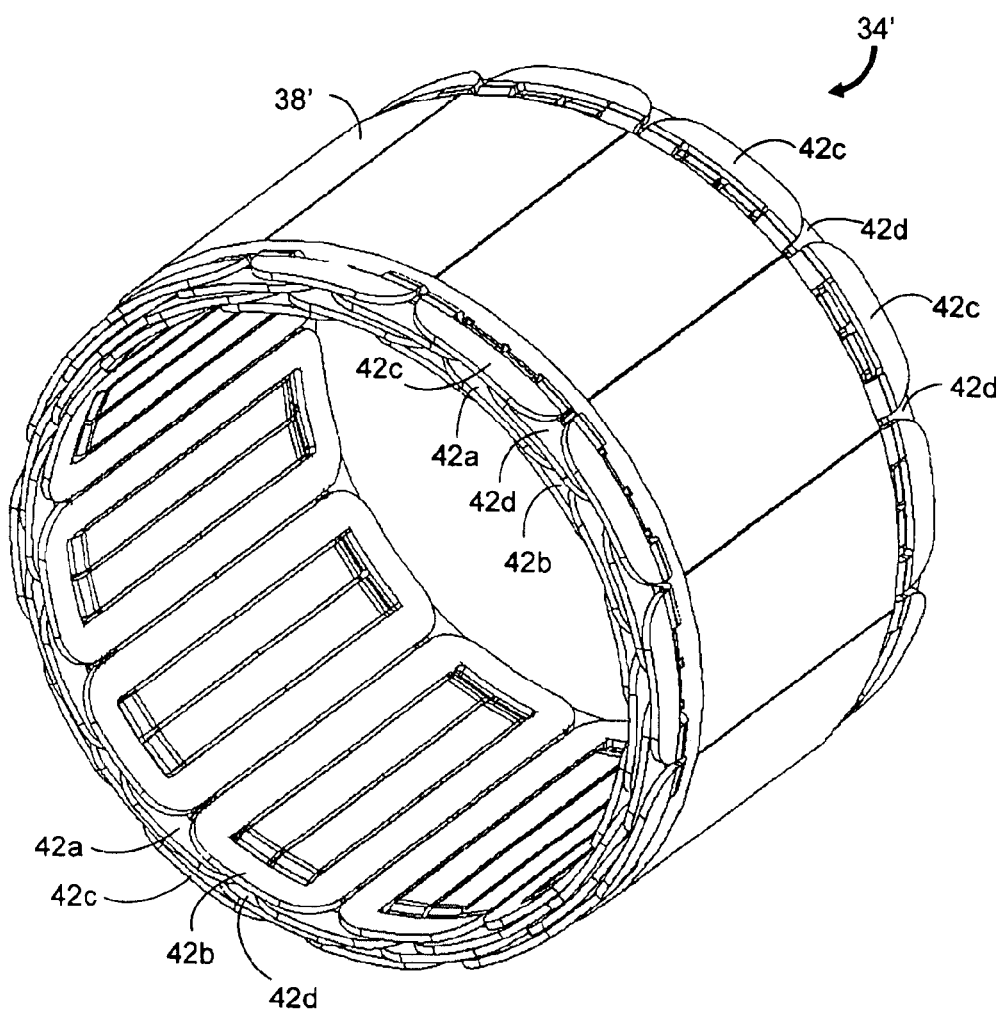
FIG. 6 is an illustration of another embodiment of a stator in accordance with the principles of the invention.
Figure 7:
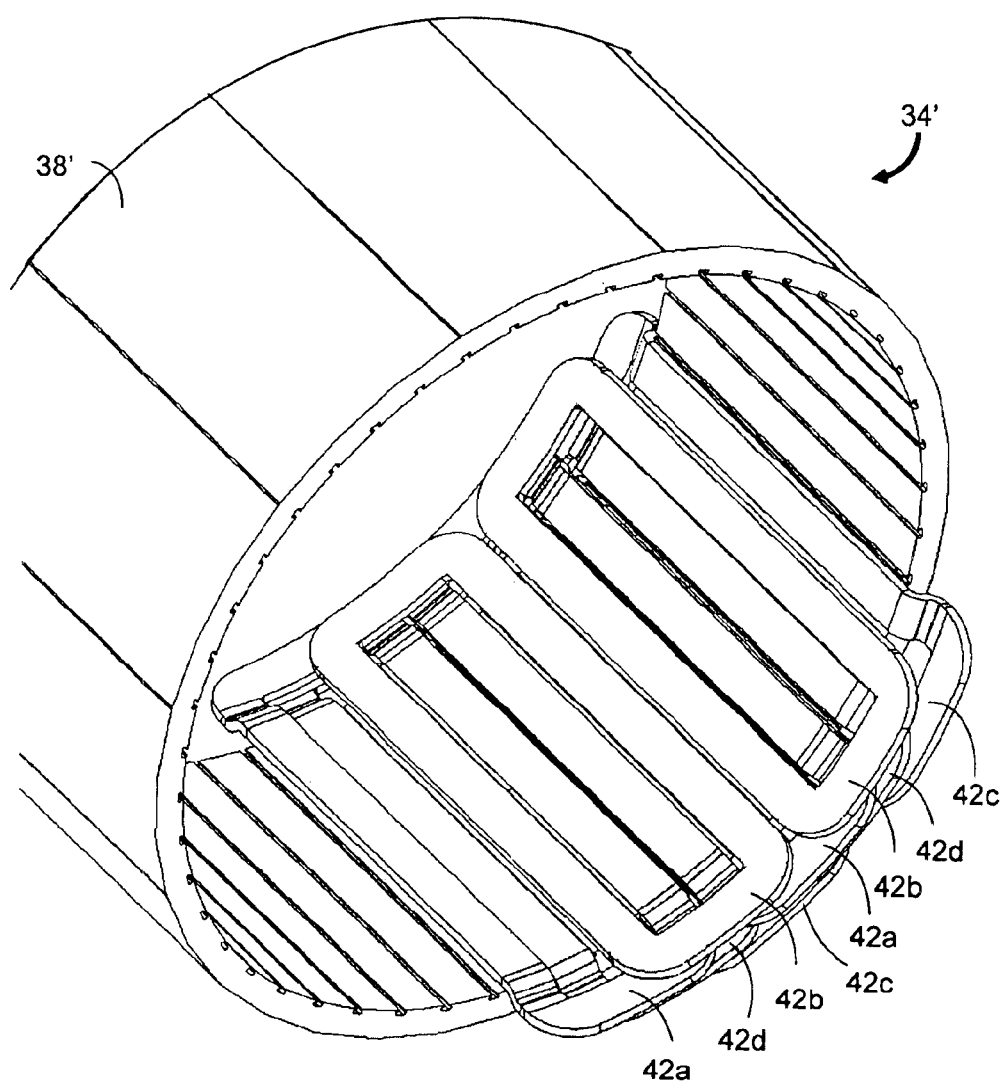
FIG. 7 is an illustration of the stator of FIG. 6 with most of the coils removed.

FIG. 6 illustrates another embodiment of a stator 34' constructed in accordance with the principles of the invention. FIG. 7 illustrates the stator 34' of FIG. 6 with some of the coils 42 removed for easier recognition of coil placement. The stator 34' includes a slotless stator core 38' populated with four types of coils 42a, 42b, 42c and 42d (generally 42). The A coils 42a and B coils 42b (i.e., inner coils) form an inner coil layer, and the C coils 42c and D coils 42d (i.e., outer coils) form an outer coil layer. The coils 42 are fabricated using similar materials and techniques to those employed for fabricating the coils 42 for the stator 34 of FIG. 2. Some coils 42a and 42b are formed in according to the A and B configurations, respectively, described above. Other coils 42c and 42d are formed in a "C" configuration and a "D" configuration, respectively, as described below. The specific dimensions of each configuration are determined according to the specific machine design parameters and accommodate the other coil configurations. As described for the previous embodiment, the fully populated stator 34' is subjected to a vacuum pressure impregnation process to impregnate the coils 42 with an epoxy resin to achieve improved thermal conductivity and electrical insulation. Due to the configurations and reduced thickness of the coils 42 as compared to conventional stator coils, the resulting stator 34' has reduced radial extent and, therefore, occupies less volume than conventional stators.

FIGS. 8A to 8D depict a variety of views for a C coil 42c used to fabricate the stator of FIGS. 6 and 7. The C coil 42c includes two longitudinal sections 50c and two circumferential sections 54c which describe an approximately rectangular opening 58c. Two wire leads (not shown) extend from one of the circumferential sections 54c to allow external connection to other similarly phased coils 42 and electrical control equipment. The longitudinal sections 50c have a width w that lies along a curve 78 having a radius r' approximately equal to the distance to the stator axis. A step bend 66c is located near each end of each longitudinal section 50c. The increased radial distance to the stator axis is selected to permit the circumferential sections 54c of the C coil 42c to avoid interfering with the circumferential sections 54a, 54b and 54d of the other coils 42a, 42b and 42d.

FIGS. 9A to 9D depict a variety of views for a D coil 42d used to fabricate the stator of FIGS. 6 and 7. The D coil 42d includes two longitudinal sections 50d and two circumferential sections 54d which describe an approximately rectangular opening 58d. Two wire leads (not shown) extend from one of the circumferential sections 54d to allow external connection to other similarly phased coils 42 and electrical control equipment. The longitudinal sections 50d have a width w that lies along a curve 78' having the same radius r' as the curve 78 depicted in FIG. 7C. The step bends 66d provide an increased radial distance to the stator axis so that the circumferential sections 54d of the D coil 42d do not interfere with the circumferential sections 54a, 54b and 54c of the other coils 42a, 42b and 42c.

There is no difficult interleaving or overlapping step required when installing the coils 42 into the stator core 38'. Coils 42 are inserted into the stator core 38' one layer at a time. First, the C coils 42c are inserted side by side along the inner surface of the stator core 38'. The D coils 42d are then inserted to complete the outer coil layer. When properly positioned, each longitudinal section 50d of a D coil 42d lies within the rectangular opening 58c of a respective neighboring C coil 42c. Similarly, the rectangular opening 58d of the D coils 42d are occupied by a longitudinal section 50c of each of the respective neighboring C coils 42c. Next, the A coils 42a are placed into the stator core 38' in a side by side arrangement inside the outer coil layer. The B coils 42b are then inserted to complete the inner coil layer. When arrangement is completed, each longitudinal section 50b of the B coils 42b lies within the rectangular opening 58a of a respective neighboring A coil 42a, and each longitudinal section 50a of the A coils 42a lies within the rectangular opening 58b of a respective neighboring B coil 42b. The different offsets provided by the step bends 66a, 66c and 66d ensures that the circumferential sections 54 do not interfere with each other.

As previously described, the inductance and resistance of each coil 42 is dependent on its configuration. A coil set is created by serially connecting a coil 42 from each of the four configurations. Thus each coil set has substantially the same inductance and resistance as the other coil sets. Optionally, a coil set is serially connected with one or more other coil sets. In another alternative, a coil set is connected in parallel with one or more other coil sets. Other combinations of serial and parallel electrical connections can be used to achieve the desired electromotive force at the base speed of the motor.

While the invention has been shown and described with reference to specific preferred embodiments, it should be understood by those skilled in the art that various changes in form and detail may be made therein without departing from the spirit and scope of the invention as defined by the following claims.

What is claimed is:

1. A stator coil group for an electromotive machine comprising:

a plurality of first inner coils, each first inner coil having a pair of longitudinal sections, a pair of circumferential sections and a thickness, each of the longitudinal sections and the circumferential sections of the first inner coils being disposed at a first radial distance from a cylindrical axis, the longitudinal sections and circumferential sections of each first inner coil defining a substantially rectangular opening therein; and a plurality of second inner coils, each second inner coil having a pair of longitudinal sections, a pair of circumferential sections and a thickness, each of the longitudinal sections of the second inner coils being disposed at the first radial distance from the cylindrical axis and each of the circumferential sections of the second inner coils being disposed at a second radial distance from the cylindrical axis, the longitudinal sections and circumferential sections of each second inner coil defining a substantially rectangular opening therein, one of the longitudinal sections of each first inner coil being at least partially disposed in the rectangular opening of an adjacent one of the second inner coils and one of the longitudinal sections of each second inner coil being at least partially disposed in the rectangular opening of an adjacent one of the first inner coils, each of the first inner coils being in serial electrical communication with a respective one of the second inner coils to form a coil pair;

a plurality of first outer coils, each first outer coil having a pair of longitudinal sections, a pair of circumferential sections and a thickness, each of the longitudinal sections of the first outer coils being disposed substantially in contact with respective longitudinal sections of the first and second inner coils at a third radial distance from the cylindrical axis wherein the third radial distance exceeds the first radial distance, the longitudinal sections and circumferential sections of each first outer coil defining a substantially rectangular opening therein; and a plurality of second outer coils, each second outer coil having a pair of longitudinal sections, a pair of circumferential sections and a thickness, each of the longitudinal sections of the second outer coils being disposed substantially in contact with respective longitudinal sections of the first and second inner coils at the third radial distance from the cylindrical axis, the longitudinal sections and circumferential sections of each second outer coil defining a substantially rectangular opening therein, one of the longitudinal sections of each first outer coil being at least partially disposed in the rectangular opening of an adjacent one of the second outer coils and one of the longitudinal sections of each second outer coil being at least partially disposed in the rectangular opening of an adjacent one of the first outer coils, each of the second outer coils being in serial electrical communication with one of the first inner coils, one of the second inner coils and one of the first outer coils to form a coil set.

2. The stator coil group of claim 1 wherein the longitudinal sections of the first and second inner coils have ends, at least one of the first plurality of inner coils and the second plurality of inner coils having a pair of step bends at each end of the respective longitudinal sections.

3. The stator coil group of claim 1 wherein one of the coil sets is in parallel electrical communication with one of the other coil sets.

4. The stator coil group of claim 1 wherein the longitudinal sections of the first and second outer coils have ends, at least one of the first plurality of outer coils and the second plurality of outer coils having a pair of step bends at each end of the respective longitudinal sections.

5. The stator coil group of claim 1 wherein the longitudinal sections of the first and second outer coils are in contact with respective longitudinal sections of the first and second inner coils through an insulating layer.

* * * * *